(12) United States Patent
Hirai et al.

(10) Patent No.: US 6,429,829 B1
(45) Date of Patent: Aug. 6, 2002

(54) ANTENNA DEVICE

(75) Inventors: Takami Hirai, Aichi-pref; Kazuyuki Mizuno, Kasugai; Yasuhiko Mizutani, Komaki, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/685,485

(22) Filed: Oct. 10, 2000

(30) Foreign Application Priority Data

Oct. 12, 1999 (JP) .............................................. 11-290277

(51) Int. Cl.⁷ ................................................. H01Q 1/24
(52) U.S. Cl. ....................................... 343/895; 343/857
(58) Field of Search ........................ 343/700 MS, 873, 343/702, 722, 749, 850, 857, 895

(56) References Cited

U.S. PATENT DOCUMENTS 5,218,374 A * 6/1993 Koert et al. ................. 343/789

FOREIGN PATENT DOCUMENTS

JP 9-93015 A 4/1997

* cited by examiner

*Primary Examiner*—Don Wong
*Assistant Examiner*—James Clinger
(74) *Attorney, Agent, or Firm*—Burr & Brown

(57) ABSTRACT

An antenna device is constructed such that a short circuit exists between an antenna formed on an outer surface of a dielectric substrate and an input end side resonance electrode of a filter section formed on the inside of the dielectric substrate. An output end side resonance electrode of the filter section and an output electrode are coupled to one another via a capacitance. Accordingly, noise current is not allowed to flow to an electronic circuit, which is connected to the antenna device.

6 Claims, 5 Drawing Sheets

ANTENNA DEVICE

BACKGROUND OF THE INVENTION

1. Field of the Invention

The present invention relates to an antenna device. In particular, the present invention relates to an antenna device which makes it possible for a filter section to remove the noise current such as a surge current to the outside.

2. Description of the Related Art

In general, the high frequency radio equipment such as a portable telephone carries an antenna device which has an antenna for receiving a signal, and a filter unit which has a filter section for removing any unnecessary signals from the intended signal received by the antenna device.

In recent years, it is demanded to realize a light weight and a small size of high frequency radio equipment. In order to achieve this purpose, it is demanded to miniaturize the antenna device and the filter unit. In such a viewpoint, an antenna device has been suggested, which is provided with an antenna and a filter section (see, for example, Japanese Laid-Open Patent Publication No. 9-93015), because of the following reason. That is, such an antenna device is capable of receiving the intended signal and removing any unnecessary signals. Therefore, it is unnecessary to carry a filter unit on high frequency radio equipment. Further, it is unnecessary to perform a matching adjustment between the antenna device and the filter unit. Therefore, it is possible to improve the production efficiency of the high frequency radio equipment.

However, the antenna device as described above has no circuit for removing a noise current such as a surge current to the outside of the device. For this reason, for example, when the surge current flows through the inside of the antenna device as a result of the generation of static electricity in the vicinity of the antenna, the surge current flows to an electronic circuit such as an integrated circuit (IC) connected to the antenna device, because the surge current is not removed to the outside of the device. In such a case, the electronic circuit is sometimes damaged.

In order to avoid the flow of a surge current to the electronic circuit, it is preferable that a protective circuit is installed between the antenna device and the electronic circuit. However, in this case, it is necessary to provide a space for carrying the protective circuit on a mounting substrate of the high frequency radio equipment. Therefore, it is impossible to miniaturize the high frequency radio equipment described above. Further, when the protective circuit is carried, the weight of the high frequency radio equipment is inevitably increased. Consequently, it is impossible to realize a light weight of the high frequency radio equipment.

Although the inconvenience as described above exists, there has been no countermeasure for the noise current in an antenna device having an antenna and a filter section. That is, no proposal has been made until now to construct a circuit for removing the noise current.

SUMMARY OF THE INVENTION

The present invention has been made in order to solve the problems as described above, an object of which is to provide an antenna device which makes it possible to remove the noise current from a filter section to the outside of the antenna device, so that the electronic circuit is not damaged, and it is unnecessary to carry any protective circuit.

According to the present invention, there is provided an antenna device comprising a dielectric substrate; an antenna which is formed on an outer surface of the dielectric substrate; and a filter section which includes an input electrode, an input end side resonance electrode, an output end side resonance electrode, and an output electrode electrically connected to the antenna and which is formed at the inside of the dielectric substrate; wherein the antenna and the input end side resonance electrode form a short circuit.

Owing to the arrangement as described above, a noise current such as a surge current is removed to the outside of the device via a ground electrode which is short-circuited with the input end side resonance electrode.

In this arrangement, it is preferable that the output end side resonance electrode and the output electrode are coupled to one another via a capacitance, because of the following reason. That is, even when the noise current is returned to the filter section via the ground electrode and the output end side resonance electrode with one end short-circuited with the ground electrode, the noise current is suppressed by the capacitance formed between the output end side resonance electrode and the output electrode.

Therefore, it is possible to avoid the flow of the noise current through the electronic circuit connected to the antenna device. Accordingly, it is possible to avoid damage of the electronic circuit without installing a seperate member of a propective circuit.

It is also preferable that the input electrode and the input end side resonance electrode are electrically connected to one another; and the antenna and the input electrode are electrically connected to one another in the dielectric substrate via a through-hole.

It is also preferable that the antenna is formed to have a meander line configuration. It is also preferable that one or more resonance electrodes are formed between the input end side resonance electrode and the output end side resonance electrode.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The antenna device according to the present invention will be exemplified by preferred embodiments, which will be explained in detail below with reference to the accompanying drawings.

Figure 1:
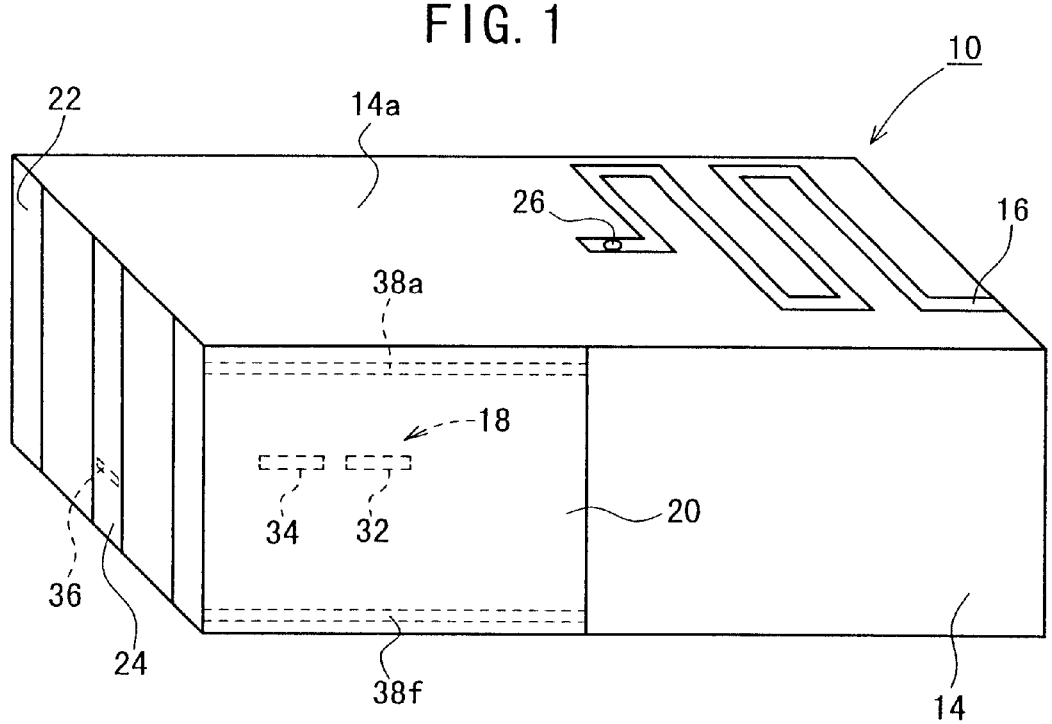
FIG. 1 shows a front perspective view illustrating an antenna device according to a first embodiment.
Figure 2:
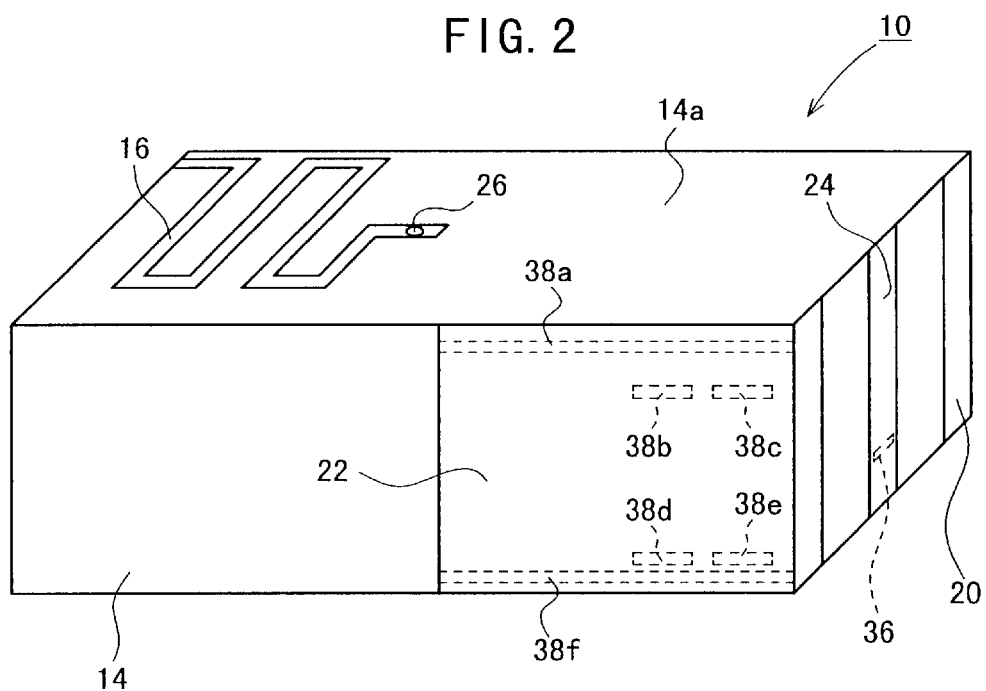
FIG. 2 shows a back perspective view illustrating the antenna device shown in FIG. 1.
Figure 3:
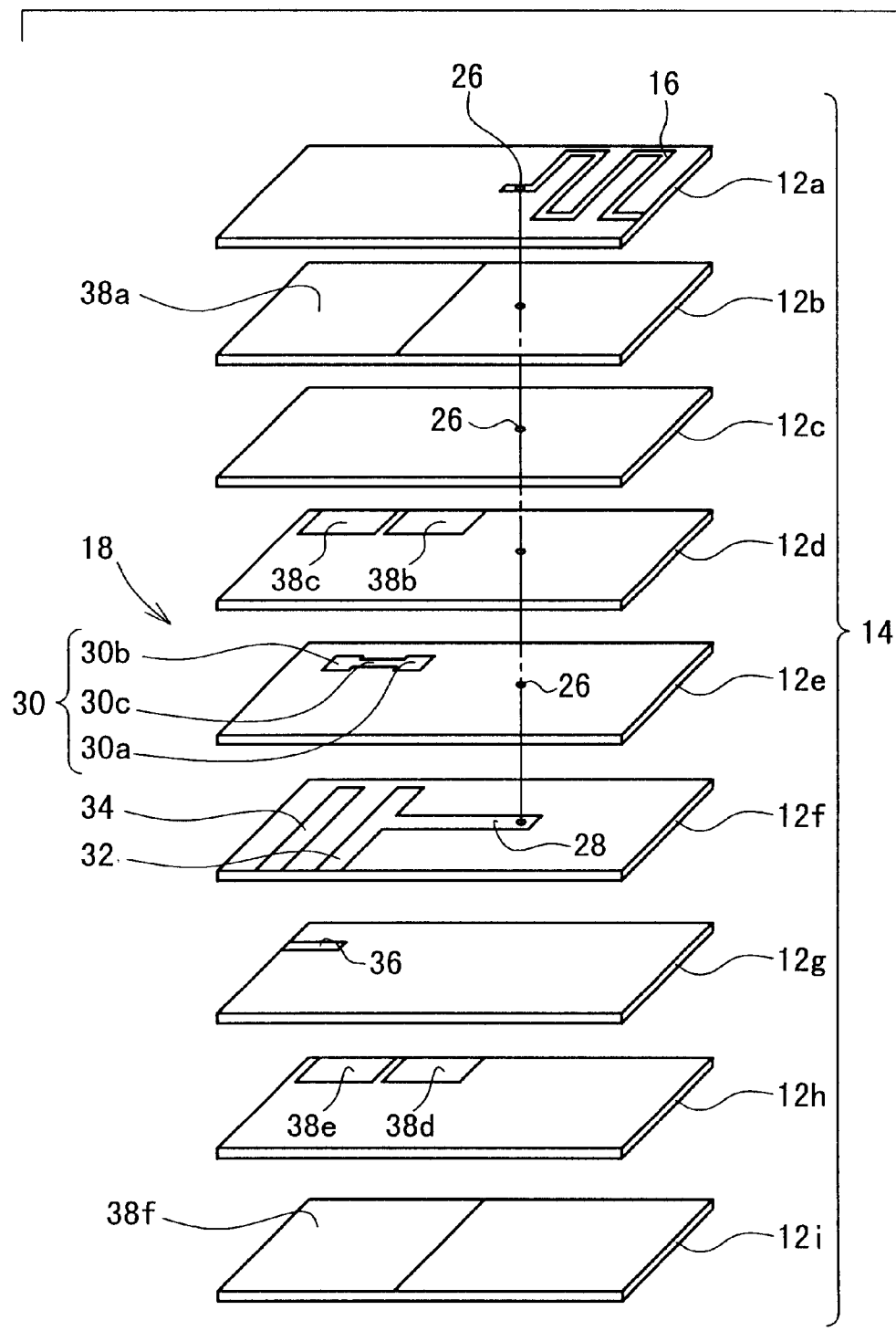
FIG. 3 shows an exploded perspective view illustrating the antenna device shown in FIG. 1.

At first, FIG. 1 shows a front perspective view illustrating an antenna device according to a first embodiment, FIG. 2 shows a back perspective view thereof, and FIG. 3 shows an exploded perspective view thereof. As shown in FIGS. 1 to 3, the antenna device 10 comprises a dielectric substrate 14 which is constructed by integrally joining nine dielectric layers 12a to 12i (see FIG. 3) by means of sintering, an antenna 16 which is formed on an upper end surface 14a of the dielectric substrate 14, and a filter section 18 which is formed at the inside of the dielectric substrate 14. A first ground electrode 20, a second ground electrode 22, and an external circuit connection terminal 24 are formed at portions of side surfaces of the dielectric substrate 14.

The antenna 16, which is formed to have a meander line configuration on the upper surface of the dielectric layer 12a, i.e., on the upper end surface 14a of the dielectric substrate 14, is provided to receive the signal. As shown in FIG. 3, the antenna 16 is electrically connected to an input electrode 28 described later on of the filter section 18 via a through-hole 26.

The filter section 18 is provided to remove any unnecessary signal from the signal received by the antenna 16. As shown in FIG. 3, the filter section 18 comprises a coupling-adjusting electrode 30 which is formed on the upper surface of the dielectric layer 12e, an input electrode 28, an input end side resonance electrode 32, and an output end side resonance electrode 34 which are formed on the upper surface of the dielectric layer 12f, and an output electrode 36 which is formed on the upper surface of the dielectric layer 12g.

Among them, a first end of the input electrode 28 is joined to the input end side resonance electrode 32. That is, both electrodes 28, 32 are short-circuited. In this arrangement, as described above, the antenna 16 is electrically connected to the input electrode 28. Therefore, the antenna 16 is consequently in a state of being short-circuited with the input end side resonance electrode 32 via the through-hole 26 and the input electrode 28. short-circuited with the input end side resonance electrode 32 via the through-hole 26 and the input electrode 28.

The input end side resonance electrode 32 and the output end side resonance electrode 34 are formed to be parallel to one another and both are inductively coupled to one another. A first end of each of the input end side resonance electrode and the output end side resonance electrode is an open end and a second end of each of them is short-circuited with the first ground electrode 20 (see FIG. 1).

The coupling-adjusting electrode 30 is constructed such that a first opposing section 30a opposed to the input end side resonance electrode 32 and a second opposing section 30b opposed to the output end side resonance electrode 34 are electrically connected to one another by the aid of a lead section 30c which is formed between the both. The input end side resonance electrode 32 and the first opposing section 30a are coupled to one another via a capacitance, and the output end side resonance electrode 34 and the second opposing section 30b are coupled to one another via a capacitance.

The output electrode 36 is coupled to the output end side resonance electrode 34 via a capacitance. The output electrode 36 is electrically connected to the external circuit connection terminal 24 (see FIG. 1).

The antenna device 10 further includes a first inner layer ground electrode 38a which is formed on the dielectric layer 12b, second and third inner layer ground electrodes 38b, 38c which are formed on the dielectric layer 12d, fourth and fifth inner layer ground electrodes 38d, 38e which are formed on the dielectric layer 12h, and a sixth inner layer ground electrode 38f which is formed on the dielectric layer 12i (see FIG. 3).

The first to sixth inner layer ground electrodes 38a to 38f will be specifically explained. At first, the first inner layer ground electrode 38a is overlapped with the input end side resonance electrode 32 and the output end side resonance electrode 34 with the dielectric layers 12b to 12e intervening therebetween. The first inner layer ground electrode 38a is short-circuited with both of the first ground electrode 20 and the second ground electrode 22 (see FIGS. 1 and 2). As shown in FIG. 3, the first inner layer ground electrode 38a is not formed at a position of being overlapped with the antenna 16. Therefore, the antenna 16 and the input electrode 28 are electrically connected to one another in a reliable manner.

As shown in FIG. 3, the second and third inner layer ground electrodes 38b, 38c are overlapped with the respective open ends of the input end side resonance electrode 32 and the output end side resonance electrode 34 with the dielectric layers 12d, 12e intervening therebetween respectively. Similarly, the third and fourth inner layer ground electrodes 38c, 38d are overlapped with the respective open ends of the input end side resonance electrode 32 and the output end side resonance electrode 34 with the dielectric layers 12g, 12f intervening therebetween respectively. The second to fifth inner layer ground electrodes 38b to 38e are short-circuited with the second ground electrode 22 (see FIG. 2).

The sixth inner layer ground electrode 38f is overlapped with the input end side resonance electrode 32 and the output end side resonance electrode 34 with the dielectric layers 12g, 12h intervening therebetween (see FIG. 3). The sixth inner layer ground electrode 38f is short-circuited with both of the first ground electrode 20 and the second ground electrode 22 (see FIGS. 1 and 2).

Figure 4:
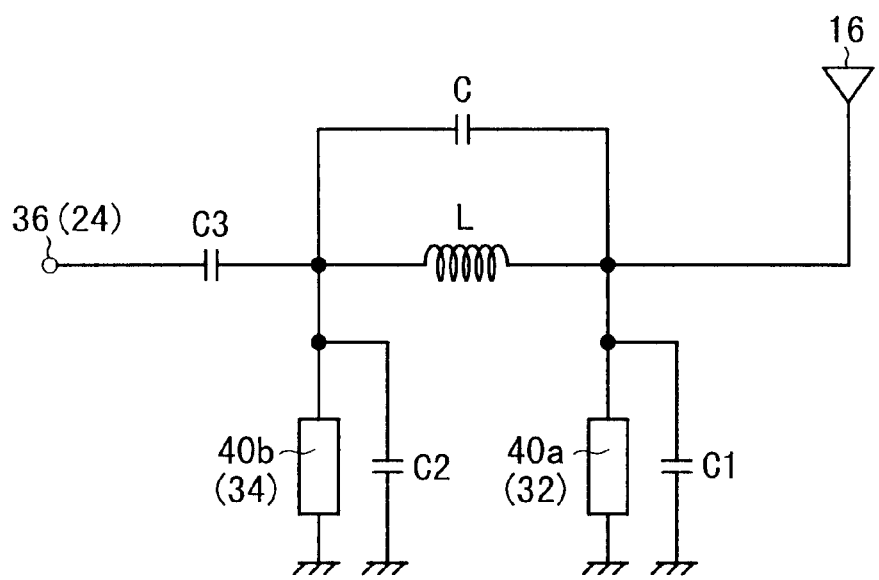
FIG. 4 shows an equivalent circuit diagram of the antenna device shown in FIG. 1.

An equivalent circuit diagram of the antenna device 10 is now shown in FIG. 4.

As described above, the input end side resonance electrode 32 and the output end side resonance electrode 34 are inductively coupled to one another. The input end side resonance electrode 32 is capacitively coupled to the first opposing section 30a of the coupling-adjusting electrode 30. Further, the output end side resonance electrode 34 is capacitively coupled to the second opposing section 30b of the coupling-adjusting electrode 30. Accordingly, an electrically equivalent state is given such that an inductance L is inserted between a resonator 40a based on the input end side resonance electrode 32 and a resonator 40b based on the output end side resonance electrode 34, and a combined capacitance C is formed. That is, it is regarded that an LC parallel resonance circuit, which is based on the inductance L and the capacitance C, is connected between the resonators 40a, 40b.

Capacitances are formed between the input end side resonance electrode 32 and the second and fourth inner layer ground electrodes 38b, 38d overlapped with the open end of the input end side resonance electrode 32 respectively. C1 in FIG. 4 indicates a combined capacitance of them. Similarly, C2 in FIG. 4 indicates a combined capacitance of capacitances which are formed between the output end side resonance electrode 34 and the third and fifth inner layer ground electrodes 38c, 38e overlapped with the open end of the output end side resonance electrode 34 respectively. The capacitances C1, C2 can be regarded such that the first ends are grounded in the equivalent circuit.

As described above, the output end side resonance electrode 34 and the output electrode 36 are capacitively coupled to one another. Therefore, assuming that the capacitance is C3, the capacitance C3 intervenes between the output end side resonance electrode 34 and the output electrode 36.

The first ends of the input end side resonance electrode 32 and the output end side resonance electrode 34 are short-circuited with the first ground electrode 20. Therefore, in the equivalent circuit, the first ends of the resonators 40a, 40b can be regarded to be grounded.

When the antenna device 10 constructed as described above is installed on a mounting substrate of a high frequency radio equipment, the noise current is removed to the outside of the antenna device 10 as follows.

The noise current, which is received by the antenna 16, arrives at the input electrode 28 via the through-hole 26. The first end of the input electrode 28 is joined to the input end side resonance electrode 32. Therefore, the noise current further flows to the input end side resonance electrode 32.

In this arrangement, as described above, the first end of the input end side resonance electrode 32 is short-circuited with the first ground electrode 20. Therefore, the noise current flows to the first ground electrode 20.

A ground electrode is also installed on the mounting substrate of the high frequency radio equipment. The first ground electrode 20 is short-circuited with the ground electrode. Therefore, the noise current flows to the ground electrode installed on the mounting substrate. That is, the noise current is consequently removed to the outside of the antenna device 10. It is possible to avoid the flow of the noise current from the input end side resonance electrode 32 to the output end side resonance electrode 34.

In this arrangement, the first end of the output end side resonance electrode 34 is also short-circuited with the first ground electrode 20. In view of this fact, it may be impossible to deny the possibility that a part of the noise current, which has flown up to the first ground electrode 20, flows to the output end side resonance electrode 34 via the first ground electrode 20.

However, in the case of the antenna device 10, the capacitance C3 intervenes between the output end side resonance electrode 34 and the output electrode 36. Usually, the noise current is a direct current or a low frequency alternating current. Therefore, the noise current is removed (trapped) by the capacitance C3. That is, the noise current does not flow to the output electrode 36.

As described above, the output end side resonance electrode 34 and the output electrode 36 are coupled to one another via the capacitance, and thus it is possible to more effectively avoid the inflow of the noise current into the electronic circuit connected to the antenna device 10.

Figure 5:
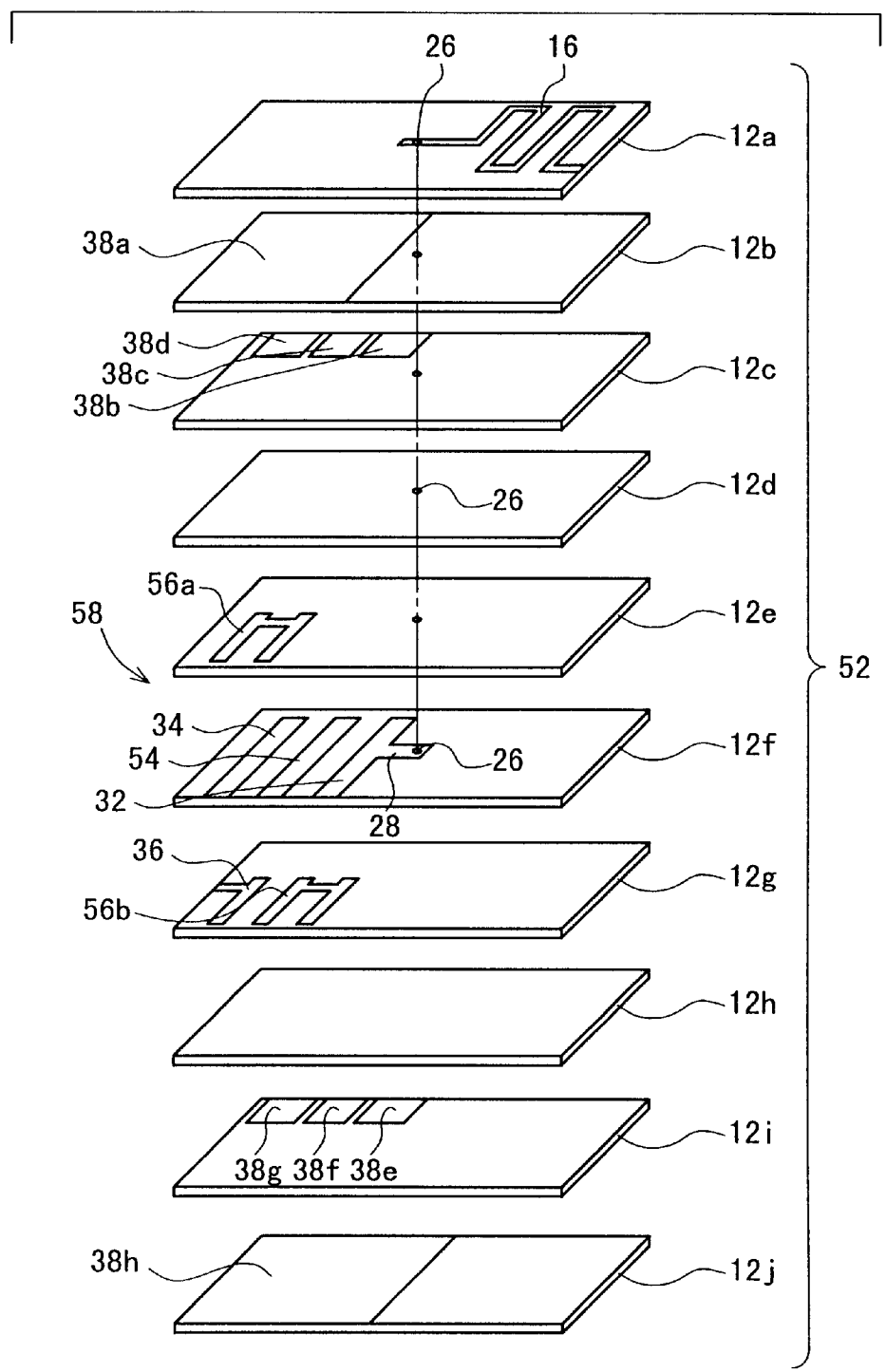
FIG. 5 shows an exploded perspective view illustrating an antenna device according to a second embodiment.

Another antenna device other than the antenna device 10 described above may be also exemplified as a preferred embodiment of the antenna device according to the present invention, in which one or more resonance electrodes are allowed to intervene between the input end side resonance electrode 32 and the output end side resonance electrode 34. An antenna device 50 is specifically exemplified, for which an exploded perspective view is shown in FIG. 5. The antenna device 50 will be explained as a second embodiment. Constitutive components corresponding to the constitutive components shown in FIGS. 1 to 4 are designated by the same reference numerals, detailed explanation of which will be omitted.

In the antenna device 50, ten dielectric layers 12a to 12j are integrally joined to one another by means of sintering to construct a dielectric substrate 52. The input end side resonance electrode 32, the output end side resonance electrode 34, and one resonance electrode 54 allowed to intervene between the both are formed on the upper surface of the dielectric layer 12f. The input electrode 28, which has its first end joined to the input end side resonance electrode 32, is electrically connected to the antenna 16 via the through-hole 26.

In this arrangement, the first inner layer ground electrode 38a is formed on the dielectric layer 12b. The first inner layer ground electrode 38a is overlapped with the input end side resonance electrode 32, the output end side resonance electrode 34, and the resonance electrode 54 with the dielectric layers 12b to 12e intervening therebetween. The second to fourth inner layer ground electrodes 38b to 38d formed on the dielectric layer 12c are overlapped with the respective open ends of the input end side resonance electrode 32, the resonance electrode 54, and the output end side resonance electrode 34 with the dielectric layers 12c to 12e intervening therebetween respectively. Similarly, the fifth to seventh inner layer ground electrodes 38e to 38g formed on the dielectric layer 12i are overlapped with the respective open ends of the electrodes 32, 54, 34 with the dielectric layers 12f to 12h intervening therebetween respectively. Further, the eighth inner layer ground electrode 38h formed on the dielectric layer 12j is overlapped with the input end side resonance electrode 32, the output end side resonance electrode 34, and the resonance electrode 54 with the dielectric layers 12g to 12i intervening therebetween.

A coupling-adjusting electrode 56a, which is mutually coupled to the resonance electrode 54 and the output end side resonance electrode 34 via capacitances respectively, is formed on the dielectric layer 12e.

On the other hand, a coupling-adjusting electrode 56b, which is mutually coupled to the resonance electrode 54 and the input end side resonance electrode 32 via capacitances respectively, is formed on the dielectric layer 12g. The output electrode 36, which is coupled to the output end side resonance electrode 34 via a capacitance, is formed on the dielectric layer 12g while being separated from the coupling-adjusting electrode 56b by a predetermined spacing distance. That is, in the antenna device 50, the filter section 58 comprises the input electrode 28, the input end side resonance electrode 32, the resonance electrode 54, the output end side resonance electrode 34, the output electrode 36, and the two coupling-adjusting electrodes 56a, 56b.

The antenna device 50 is constructed in the same manner as the antenna device 10 according to the first embodiment except for the foregoing points. Therefore, also in the antenna device 50, the noise current is removed to the outside, or the noise current is trapped similarly to the antenna device 10.

That is, the noise current, which is received by the antenna 16 and which arrives at the input end side resonance electrode 32 via the through-hole 26 and the input electrode 28, flows to the first ground electrode 20, because the first end of the input end side resonance electrode 32 is short-circuited with the first ground electrode 20 formed on the outer surface of the dielectric substrate 52. Further, the noise current flows to the ground electrode which is installed on the mounting substrate of the high frequency radio equipment. As a result, the noise current is removed to the outside of the antenna device 50.

When a part of the noise current flows to the output end side resonance electrode 34 which is short-circuited with the first ground electrode 20, the noise current is removed (trapped) by the capacitance C3 which intervenes between the output end side resonance electrode 34 and the output electrode 36. Accordingly, no noise current flows to the output electrode 36.

To sum up, the antenna 16 is short-circuited with the input end side resonance electrode 32, and thus the noise current can be removed to the outside of the antenna device 50. Even when the noise current is returned to the filter section 18 via the output end side resonance electrode 34, the noise current can be suppressed by the aid of the capacitance C3 which is formed between the output end side resonance electrode 34 and the output electrode 36.

As described above, the noise current is removed to the outside via the input end side resonance electrode 32 and the first ground electrode 20, or the noise current is trapped by the capacitance C3. Therefore, it is possible to avoid the flow of the noise current to the external circuit connection terminal 24 and the followings. Accordingly, it is possible to avoid the damage of the electronic circuit such as IC without installing a separate member of a protective circuit.

It is a matter of course that the antenna device according to the present invention is not limited to the embodiments described above, which may be embodied in other various forms without deviating from the gist or essential characteristics of the present invention.

What is claimed is:

1. An antenna device comprising:

a dielectric substrate;

an antenna which is formed on an outer surface of said dielectric substrate; and a filter section which is electrically connected to said antenna and which is formed at the inside of said dielectric substrate, wherein:

said filter section includes an input electrode, an input end side resonance electrode, an output end side resonance electrode, and an output electrode; and said antenna and said input end side resonance electrode of said filter section are short-circuited.

2. The antenna device according to claim 1, wherein said output end side resonance electrode and said output electrode are coupled to one another via a capacitance.

3. The antenna device according to claim 1, wherein respective first ends of said input end side resonance electrode and said output end side resonance electrode are connected to a ground electrode.

4. The antenna device according to claim 1, wherein:

said input electrode and said input end side resonance electrode are electrically connected to one another; and said antenna and said input electrode are electrically connected to one another in said dielectric substrate via a through-hole.

5. The antenna device according to claim 1, wherein said antenna is formed to have a meander line configuration.

6. The antenna device according to claim 1, wherein one or more resonance electrodes are formed between said input end side resonance electrode and said output end side resonance electrode.

* * * * *